(12) United States Patent
Bech

(10) Patent No.: US 7,854,592 B2
(45) Date of Patent: Dec. 21, 2010

(54) WIND TURBINE ROTOR, A ROTATION CONTROLLING MECHANISM AND A METHOD FOR CONTROLLING AT LEAST ONE BLADE OF A WIND TURBINE ROTOR

(75) Inventor: Anton Bech, Ringkøbing (DK)

(73) Assignee: Vestas Wind Systems A/S (DK)

( * ) Notice: Subject to any disclaimer, the term of this patent is extended or adjusted under 35 U.S.C. 154(b) by 195 days.

(21) Appl. No.: 12/200,236

(22) Filed: Aug. 28, 2008

(65) Prior Publication Data

US 2009/0016885 A1 Jan. 15, 2009

Related U.S. Application Data

(63) Continuation of application No. PCT/DK2007/000084, filed on Feb. 21, 2007.

(51) Int. Cl.
*F03D 7/00* (2006.01)
(52) U.S. Cl. .................. 416/155; 416/160; 416/170 R; 416/205
(58) Field of Classification Search ................. 416/155, 416/160, 170 R, 205
See application file for complete search history.

(56) References Cited

U.S. PATENT DOCUMENTS

2003/0129059 A1* 7/2003 Nord ........................... 416/160

FOREIGN PATENT DOCUMENTS

| DE | 3415428 A1 | 10/1985 |
|---|---|---|
| DE | 4412898 A1 | 10/1995 |
| DE | 19634059 C1 | 10/1997 |
| DE | 10321535 B3 | 10/2004 |
| DE | 202005014699 U1 | 12/2005 |
| EP | 0674122 A2 | 9/1995 |
| EP | 1286048 A1 | 8/2002 |
| JP | 60081469 A1 | 9/1985 |
| WO | 00/61942 A | 10/2000 |
| WO | 2005/019642 A1 | 8/2003 |
| WO | WO 2004068678 A1 * | 8/2004 |
| WO | WO 2005050058 A1 * | 6/2005 |

OTHER PUBLICATIONS

International Search Report, Sep. 19, 2007, 3 pages.
International Preliminary Report on Patentability, Jul. 11, 2008, 9 pages.

* cited by examiner

*Primary Examiner*—Edward Look
*Assistant Examiner*—Jesse Prager
(74) *Attorney, Agent, or Firm*—St. Onge Steward Johnston & Reens LLC

(57) ABSTRACT

The invention relates to a wind turbine rotor comprising at least one blade and at least on pitch mechanism comprising a ring shaped motor for controlling the blade. The wind turbine rotor is characterized in that, the ring shaped motor controls the blade through gearing means of a planetary type. The invention further relates to a rotation controlling mechanism comprising, at least one ring shaped motor for controlling the rotation of at least one first part in relation to at least one second part. The rotation controlling mechanism is characterized in that, the ring shaped motor controls the relative rotation through gearing means of a planetary type. Even further the invention relates to a method for controlling at least one blade of a wind turbine rotor.

17 Claims, 8 Drawing Sheets

WIND TURBINE ROTOR, A ROTATION CONTROLLING MECHANISM AND A METHOD FOR CONTROLLING AT LEAST ONE BLADE OF A WIND TURBINE ROTOR

CROSS-REFERENCE TO RELATED APPLICATIONS

The present application is a continuation of pending International patent application PCT/DK2007/000084, filed Feb. 21, 2007, which designates the United States and claims priority from Denmark patent application no. PA 2006 00291, filed Feb. 28, 2006, the content of which is incorporated herein by reference.

FIELD OF THE INVENTION

The invention relates to a wind turbine rotor comprising at least one blade, and at least one pitch mechanism comprising a ring shaped motor for controlling rotation of at least one blade, and a method for controlling at least one blade of a wind turbine rotor.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

The pitching of wind turbine blades is commonly done with a hydraulic system based on electrical powered oil pump, proportional valve and hydraulic cylinder acting on the blade. A much more direct way is to let an electrical motor act directly on the blade. Pitch systems has been made with electromechanical activation. One known way is to make the blade rotation with a geared motor, which rotate the blade by an open gear. Another known way is to have a linear activator (spindle and motor) to replace the function of the hydraulic cylinder. Both solutions have the inhered disadvantage, which is the motion of moving contact in gears or in treats. This means risk of wear, which can limit the life of the elements.

A contact free pitch motor could be advantageous. Such can be imagined. Think of an electrical motor, where the case is flanged to the hub and the blade is mounted on the rotor. If the motor is dominantly disk-shaped-like and merged with a blade bearing, say the motor has almost the same diameter as the blade bearing, a motorized slewing unit is made.

A motor for such design will have a large diameter and will naturally be without centre. The motor will look like a slewing ring, where the one ring is the rotor and the other is the stator. An example of this is disclosed in the international patent application WO 2005/019642 A1, where the rotor of a direct drive motor is attached more or less directly to a wind turbine blade and the stator is connected to the hub.

In this design, the direct drive motor has to handle the full blade torque moment. This demands a motor with very high torque and very low speed, which results in a large and expensive motor.

WO 2005/019642 A1 further disclose that the direct drive motor could act on the blade through a bull gear. But this solution has the implications, that to reduce the torque the bull gear ring—on which the pinion acts—has to be as large as possible, which results in limited space for a direct drive motor concentric to the pinion.

Say the bull gear is dentations of the inner ring of the blade bearing and almost in plane with the inner of the blade and hub. Then the motor cannot be much larger than the pinion. In such case the use of a direct motor makes no sense. Decreasing the bull gear diameter makes space for a larger direct motor, but reduces the gear ratio; hence the direct motor must have a larger torque capacity. The solution with a pinion and bull gear is contradictive to their statement about the benefit of the direct motor.

The use of a pinion also requires separate bearings for both the pinion and the direct motor. Most disadvantageously is the problem of having one large pinion in mesh with the bull gear. The tooth, which is in mesh at the dominant tip angle will be loaded frequently, which will cause wear and fatigue considerations.

An object of the invention is therefore to provide for an advantageous technique for controlling the blade of a wind turbine rotor, which do not include the above mentioned disadvantages.

SUMMARY OF THE INVENTION

The invention provides for a wind turbine rotor comprising at least one blade and at least one pitch mechanism comprising a ring shaped motor for controlling the blade. The wind turbine rotor is characterized in that, the ring shaped motor controls the blade through gearing means of a planetary type.

Using a ring shaped motor is advantageous, in that a ring shaped motor has a free centre, i.e. the motor is formed as an annular ring providing free access through its centre to the inside of the blade.

Furthermore it is advantageous to gear the motor torque, in that it hereby is possible to reduce the motor torque needed to control the blade, and using a planetary gear for this purpose is advantageous, in that planetary gears are the most compact embodiment of a gearbox, and in applications, such as pitch mechanisms for wind turbine blades—where minimum size and weight are important—the use of planetary gears are very advantageous.

Even further, the combination of a ring shaped motor and a planetary gear for controlling the blade is advantageous in that, such a combination is very suitable for active controlling of the blade with small service cost. The wear parts could basically be reduced brake pads, brake beam and backup batteries. All item to replace is of sizes, which can be changed without large cost to manipulate them.

In an aspect of the invention, said ring shaped motor controls said blades pitch angle in relation to a hub of said rotor.

Hereby, an advantageous embodiment of the invention is achieved.

In an aspect of the invention, an annulus gear of said gearing means is rigidly directly or indirectly mounted on a hub of said rotor.

Connecting the annulus gear of the planetary gear rigidly to the hub is advantageous, in that the two parts hereby can increase each others rigidity.

In an aspect of the invention, said gearing means comprise a plurality of planet gear wheels, such as more than three planet gear wheels.

The more planet gears the planetary gear comprises, the more evenly the torque from the ring shaped motor is distributed to the blade. If e.g. the entire torque where to be transferred through a single gear—like in traditional pitch gearmotor and pinion gear systems—the entire torque is in principle transferred through a single point. This would require gears of a very large module and the entire system (blade, hub, gears etc.) would have to be very rigid for not to be distorted, deformed or damaged, when transferring this huge load substantially through a single point, which again would lead to a disadvantageous weight increase in the hub and a significant increase in the manufacturing costs.

Making the planetary gear comprise a plurality of planet gears are therefore advantageous, in that the torque hereby is transferred more evenly and gentle to the blade.

Furthermore, by using a plurality of planet gears, the total play between the planets and the annulus gear and sun gear, is reduced, which then reduces the possibility of backlash in the gear, in that inaccuracies will level each other out. And when using a plurality of planet gears, the torque that the individual planet has to transfer, is reduced, which means that the module of the planets can be reduced. The lower the module, the more refined and precise the gear parts are made and this fact will also contribute to reducing the play and thereby reducing or eliminating backlash through the gear.

In an aspect of the invention, said plurality of planet gear wheels is directly or indirectly mounted on said at least one blade.

Making the blade directly or indirectly act as planet carrier in the planetary gear is advantageous, in that a simple and advantageous design of the planetary gear hereby is achieved.

In an aspect of the invention, said plurality of planet gear wheels is flexible mounted.

If the planetary gear comprises more than three planet gears the design becomes statically indeterminate, and if the planetary gear comprises e.g. twelve planet gears it becomes almost impossible to ensure that that all the planets mesh equally with both sun and annulus gear at all times.

The planetary gear parts and the parts, to which they are attached, would have to be extremely rigid and they would have to be manufactured with a very high degree of accuracy to ensure that e.g. all twelve planet gears mesh perfectly with both sun gear and annulus gear at all times. Such a system would be both heavy and expensive.

By mounting the planet gear shafts e.g. by means of flexible bearings, these bearings could compensate for any inherited alignment or angle inaccuracies or any distortion of the part during transferring of great torques. This will severely reduce both the weight and the manufacturing costs of the gear parts and the related rotor parts.

Furthermore, a flexible suspension of the planets e.g. by mounting the planet gear shafts in flexible bearings will reduce the transferring of gear vibrations to other parts of the rotor, hereby reducing the noise emission from the wind turbine.

In an aspect of the invention, at least one of said plurality of planet gear wheels comprises at least two different gear stages for altering the gear ration of said gearing means of a planetary type.

A planetary gear with a large sun gear and a large annulus gear diameter do only have a gear ratio just above 1:2. To enhance the gear ratio and still maintain the benefit of the planetary gear, planet gears with at least two gear stages for different gear diameters can advantageously be used. The planet gear stage with the larger diameter can e.g. mesh with the sun gear and the planet gear stage with the smaller diameter can e.g. mesh with the annulus gear. Hereby, the gear ratio of the planetary gear can be altered and increased to e.g. 1:4 or 1:5. This is advantageous, in that the motor torque needed to control the blade can be reduced accordingly, hereby reducing the size, weight and cost of the ring shaped motor.

In an aspect of the invention, a rotor part of said ring shaped motor comprises a sun gear of said gearing means.

Hereby is achieved an advantageous embodiment of the invention.

In an aspect of the invention, said sun gear of said gearing means are formed integrally in said rotor part of said ring shaped motor.

Ring shaped motors for this purpose will most likely have to be made specifically for the given task. Providing the rotor part of the ring shaped motor with a toothed rim is therefore advantageous, in that weight, assembly time and manufacturing time can be reduced.

In an aspect of the invention, said ring shaped motor comprise at least one motor bearing substantially fixating the gab between a rotor part and a stator part of said ring shaped motor.

The forces between the rotor part and stator part of the ring shaped motor are large and the gab between the parts is small (typically 0.5 mm). If the rotor part is not governed precisely, the rotor can easily collide with the stator part. The larger the diameter is, the more likely this is to happen. The hub also distorts under loads to a magnitude, where it is unsound to have a stiff rotor part spanning over the diameter of the hub. It is therefore advantageous to make the ring shaped motor comprise at least one motor bearing for ensuring the gab between the rotor and the stator.

In an aspect of the invention, said gearing means of a planetary type reduces the rotation speed of said blade in relation to a rotor part of said ring shaped motor.

By reducing the speed of the blade pitch, the blade becomes easier to control, and when making the gear reduce the rotational speed it also increases the torque accordingly, hereby amplifying this advantage.

The invention further relates to a rotation controlling mechanism comprising, at least one ring shaped motor for controlling the rotation of at least one first part in relation to at least one second part. The rotation controlling mechanism is characterized in that, the ring shaped motor controls the relative rotation through gearing means of a planetary type.

Using the combination of a ring shaped motor (commonly known as a direct drive or torque motor) in combination with at planetary gear for controlling the relative rotation between two parts is advantageous, in that it provides for at compact, light and relatively inexpensive way of controlling such a rotation.

Even further the invention relates to a method for controlling at least one blade of a wind turbine rotor, said method comprising the steps of establishing a torque by means of a ring shaped motor increasing said torque by means of gearing means of a planetary type making said increased torque control said blade.

By increasing the torque provided by the motor through a planetary gear, it is possible to reduce the size, weight and cost of the ring shaped motor.

Furthermore, a planetary gear is a very compact, light and efficient gear type, which is advantageous to use in systems where these criteria's are of great importance, such as in pitch mechanisms for wind turbine blades.

In an aspect of the invention, said ring shaped motor controls said blades pitch angle in relation to a hub of said rotor.

BRIEF DESCRIPTION OF THE DRAWINGS

The invention will be described in the following with reference to the figures in which.

DETAILED DESCRIPTION OF THE INVENTION

Figure 1:
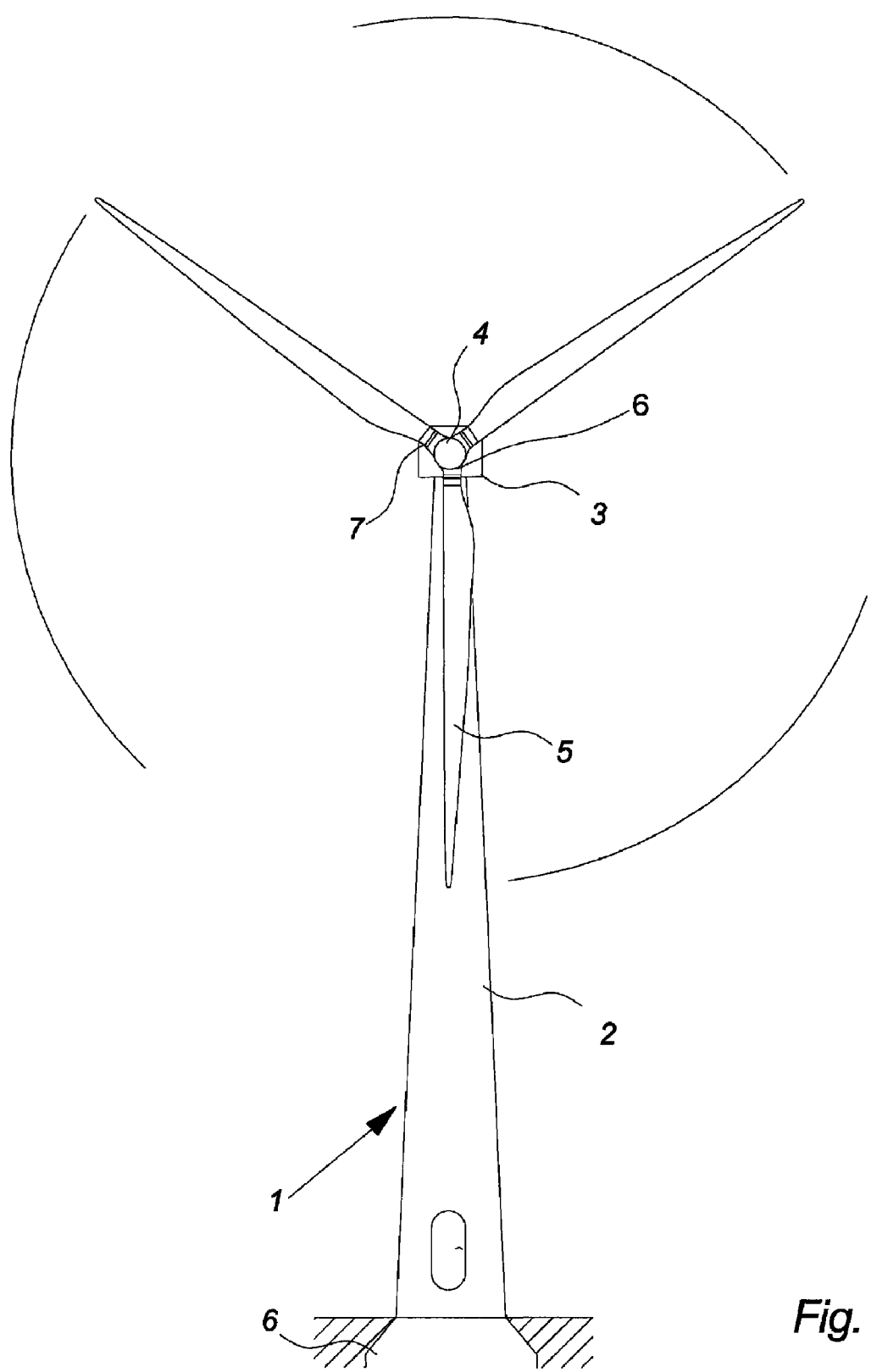
FIG. 1 illustrates a large modern wind turbine known in the art, as seen from the front.

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft 6 which extends out of the nacelle 3 front.

Figure 2:
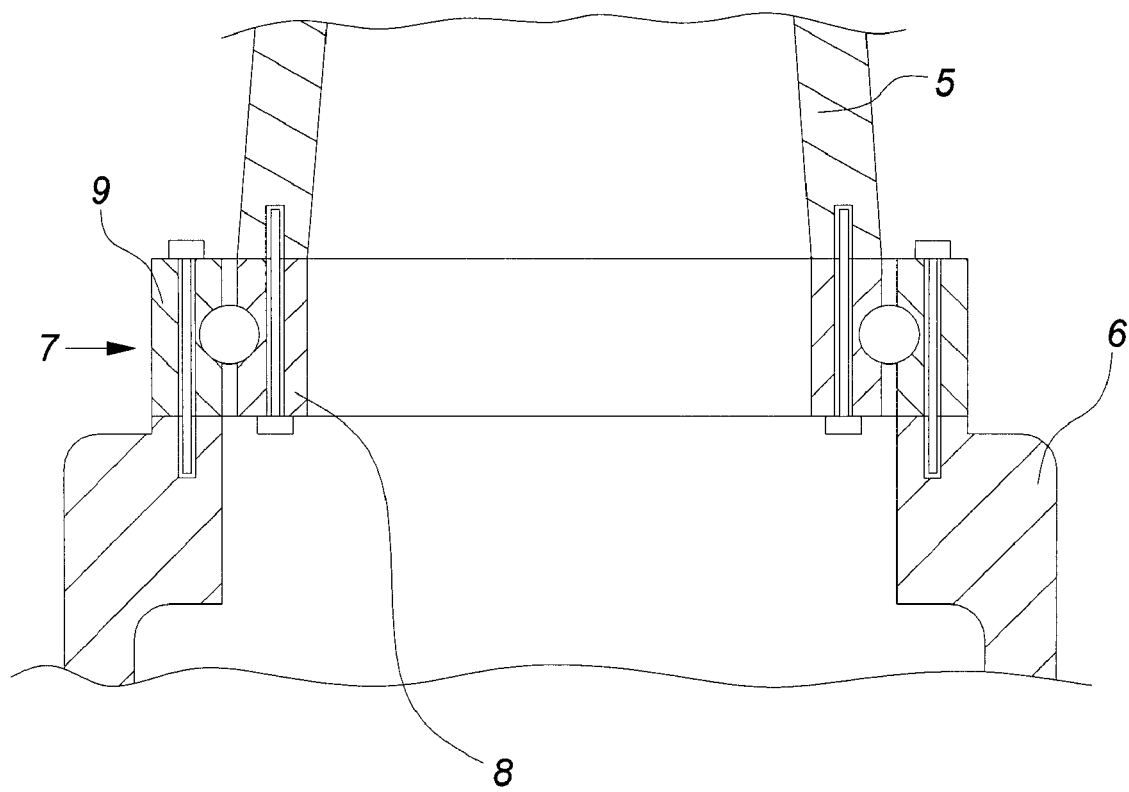
FIG. 2 illustrates a cross section of a wind turbine blade connected to a hub through an embodiment of a pitch bearing known in the art, as seen from the side.

FIG. 2 illustrates a cross section of a wind turbine blade 5 connected to a hub 6 through an embodiment of a pitch bearing 7. In this embodiment the pitch bearing 8 comprise an inner ring 8 connected directly to the root of the blade 5 and an outer ring 9 connected directly to the hub 6. The pitch bearing 7 is in this case a single row ball bearing, but it could also be a double, triple or four rowed bearing, and the elements enabling free rotation relatively between the rings 8, 9 are in this embodiment balls, but it could also be rollers, needles or other.

Figure 3:
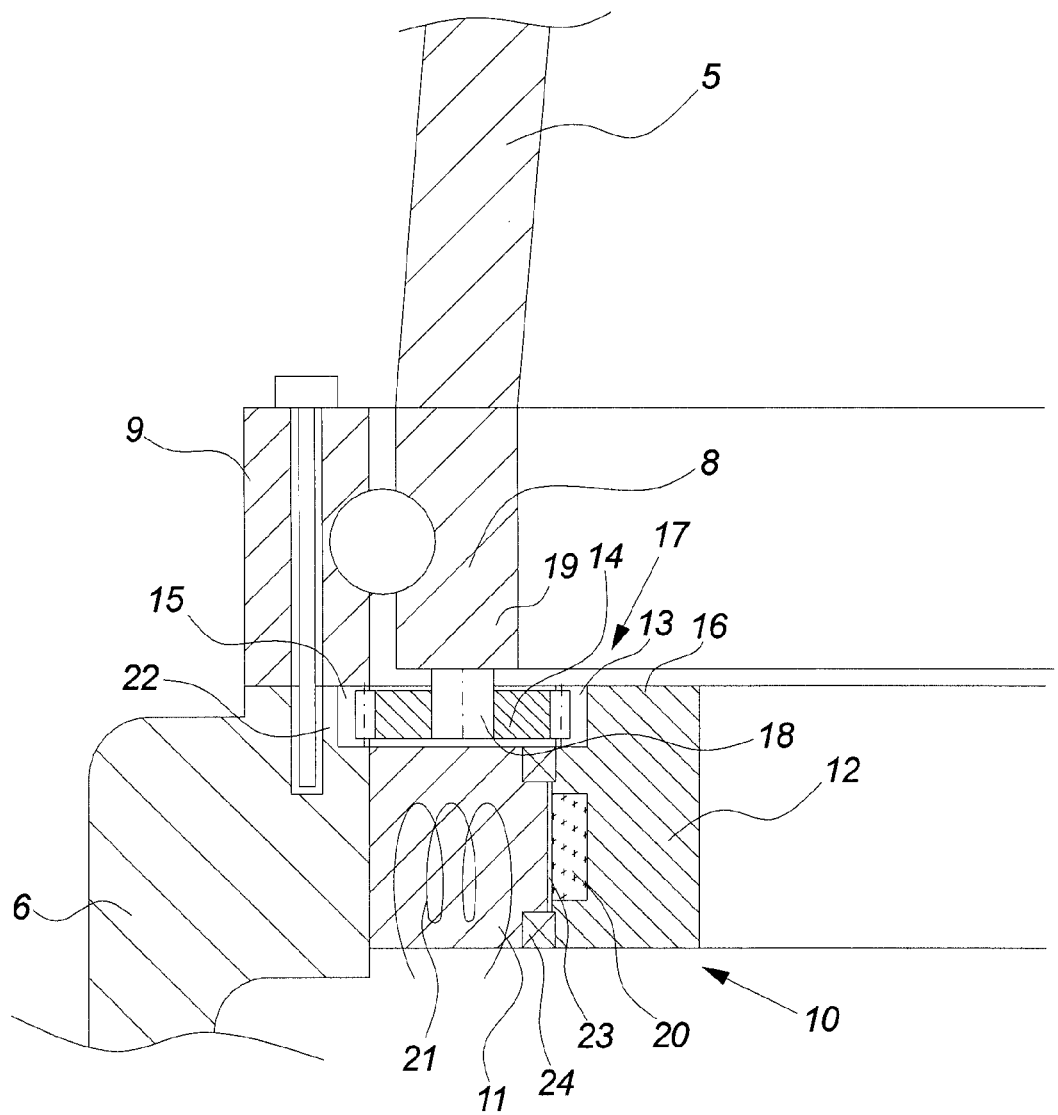
FIG. 3 illustrates a cross-section of a ring shaped motor controlling the pitch of a blade through a planetary gear, as seen from the side.

FIG. 3 illustrates a cross-section of a ring shaped motor controlling the pitch of a blade through a planetary gear, as seen from the side.

In this embodiment of the invention a stator part 11 of a ring shaped motor 10 is connected to the hub 6. A rotor part 12 is positioned inside the stator part 11, and an upper part of the rotor part 12 is provided with teeth 13 meshing with a number of planet gears 14, making the rotor part 12 act as a sun gear 16 in a planetary gear 17. The opposite sides of the planet gears 14 mesh with teeth 15 formed integrally in the upper rim of the inside of the blade hole in the hub 6, making the hub 6 act like an annulus gear 22 of a planetary gear 17. The planet gears 14 are—by means of planet gear shafts 18—indirectly and rigidly connected to the blade 5 through the inner ring 8 of the pitch bearing 7, making the blade 5 act as a planet carrier 19 of a planetary gear 17.

In this embodiment of the invention the ring shaped motor 10 is what normally is called a Direct Drive DC torque motor. A direct drive motor is a servo actuator, which is made to be directly attached to the load it drives. It has a permanent magnet field and a wound armature, which act together to convert electrical power to torque. This torque can then be utilized in positioning or speed control systems. In general, torque motors are designed for high torque at low speeds systems. Direct drive torque motors are particularly suited for servo system applications where it is desirable to minimize size, weight, power and response time, and to maximise rate and position accuracies.

Various principles of electrical motors can be used. Direct current, eddy current, synchronous, asynchronous or step motors are all options. Direct current motors are not particular suitable, as the brushes do not work well in small reversing movements. Eddy current motors are not particular suitable for low speed and high torque. Asynchronous motors are not effective at low speed. Remaining is synchronous or step motors. Both motor have the characteristics, that the rotor rigid follows the motion of the electrical field in the stator. If the field is reversed, the rotor moves one pole displacement. The rotor will typically have permanent magnets 20, but can also be with electromagnets. Electromagnets will have to be powered and when placed on the rotor part 12 of the ring shaped motor 10, the electrical connection will have to follow the motion of the rotor 12. For the pitch bearing motor 10, where the rotation is limited to 90 degrees, the electrical connection can be made by flexible cables. Permanent magnets 20 are expensive and difficulty to handle. For these reasons electrical magnets are of interest. Almost all ring shaped motors 10 on the market have permanent magnets 20 in order to allow the rotor 12 to rotate freely. Wound rotors 12 are as such not common. The fact that the motor 10 must be able to pitch without grid power, makes the electric connection to the rotor 12 a risk for failure and the industrial standard is already with permanent magnets 20, which makes the permanent magnet 20 on the rotor part 12 a preferred choice.

For the wound armature 21 of the stator part 11 and/or if the rotor part is provided with electromagnets cooling might be considered. This can e.g. be done by air cooling, cooling pipes circulating some sort of coolant, cooling fins or other.

When a motor is geared, the torque goes down with the gear ratio and the speed goes up accordingly. In this embodiment of the invention a planetary gear 17 is therefore implemented between the ring shaped motor 10 and the blade 5.

The ring shaped motor 10 does not necessarily in itself secure, that the blade 5 stays in the achieved position. It could therefore be advantageous to combine the pitch motor 10 with a brake unit (not shown).

Say the brake in this brake unit is a friction brake (not shown), which has spring loaded brake force and electrical relieved brake force, the pitch bearing 7 can be held in desired position with or without the system is energized (fail safe system). This brake system will see large number of load cycles and reversed load directions, and must therefore be designed to endure this, e.g. by making the brake pad play free with the hub 5 or other.

Furthermore, the pitching system can be provided with mechanical pitch locks in case of malfunctioning brakes and for parking locking.

To know, what the tip angle is at all time, a sensor like an encoder or electrical lineal can be implemented in the system. The feed back from the sensor tells a computer where the blade 5 is and the information can be used to control the force and the motion of the electrical field in the pitch motors 10.

A pitch movement sequenced can comprise one or more of the following steps:

Turbine controller sense power increase above set level.

The ring shaped motor 10 is told to pitch to higher tip angle (towards 90 deg.)

The rotor magnets (if electrical) and the brake are powered. Brake force is relieved.

The stator 11 is applied a forward moving electro magnetically field in the wound armature 21.

The magnetic flux between the magnets 20 in the rotor 12 and the stator 11 creates a tangential force between the parts 11, 12, which pulls the rotor 12 to rotate (pitch torque).

The phase angle between rotor 12 and stator 11 poles is measured and controls the current regulator to set the right strength of the magnet flux.

The speed of the moving field is depending on the deviation from the actual tip angle (rotor position) and the desired position.

When the desired position has been achieved and no new position is expected, the system power down and the brake spring hold the blade 5 in position. When actively pitching, where there is hardly any rest, the rotor magnets (if electrical and the brake is powered continuously.

Reversing pitch directions are made by reversing the motion direction of the electromagnetic field in the stator 11.

This system is free from backlash problems due to play in mechanical transmissions and that the forces are transmitted directly to the blade with the reaction acting on the rim of the hub.

The forces between the rotor part 12 and stator part 11 of the ring shaped motor 10 are large and the gab 23 between the parts 11, 12 is small (typically 0.5 mm). If the rotor part 12 is not governed precisely, the rotor 12 can easily collide with the stator part 11. The larger diameter the more likely this is to happen. The hub 6 also distorts under loads to a magnitude, where it is unsound to have a stiff rotor part 12 spanning over the diameter of the hub 6. As so the best motor is a thin section motor 10 with its own bearings 24 between stator 11 and rotor 12, but using the already existing pitch bearing 7 to maintain the gab 23 between the rotor and stator part 11, 12 of the ring shaped motor 10 is also within the scope of the invention.

The weight of the pitch system with ring shaped motor 10 in the hub 6 is approximately 300 kg pr. Blade 5 plus 100 kg for the motor 10 controllers. Say the pitch system in the hub 6 has a weight of 1.0 ton. On top of this a rotating transformer has to be applied in the nacelle 3.

The weight of a hydraulic pitch system known in the art is 2 tons, of which halve is from components located in the hub 6.

Figure 4:
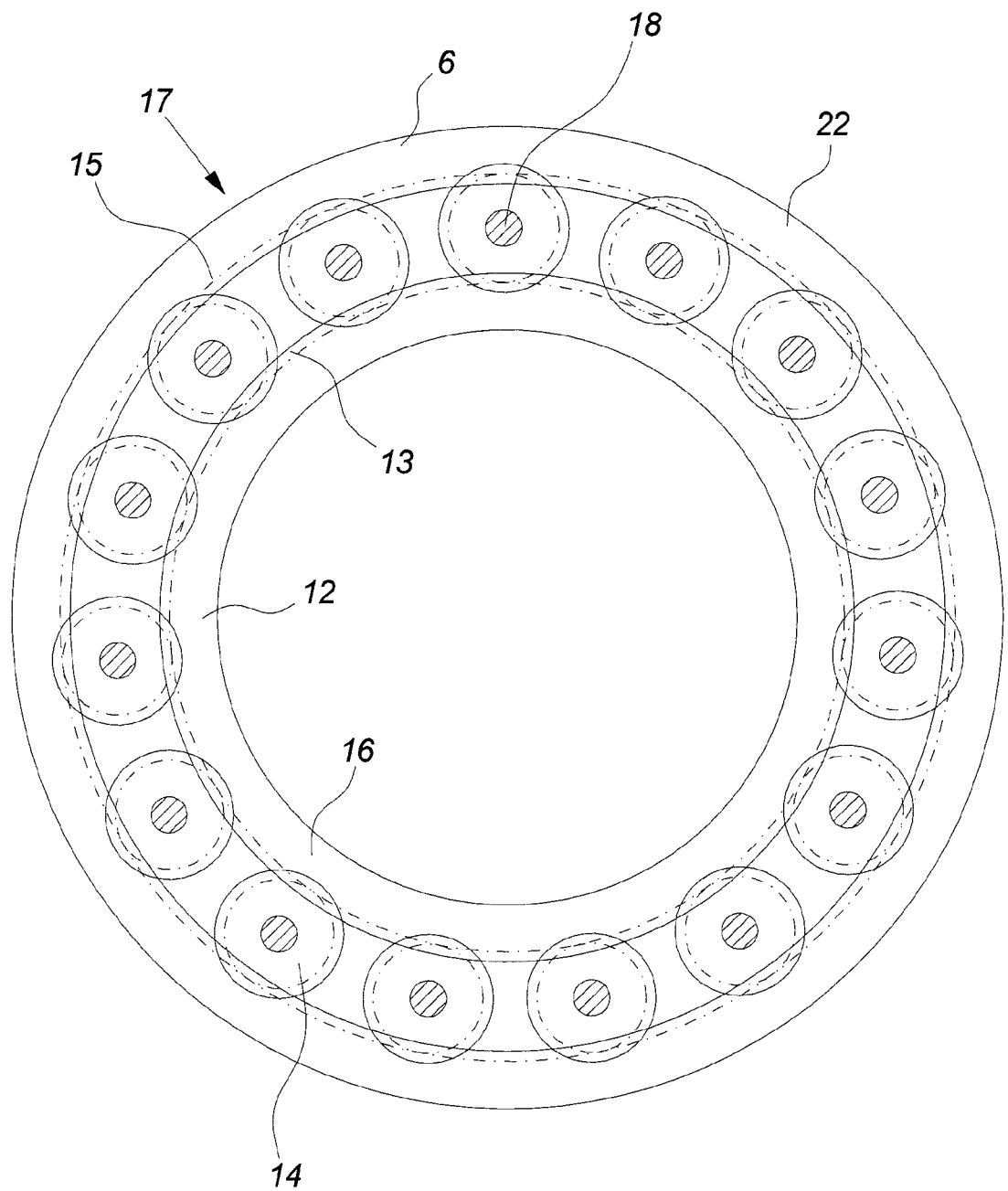
FIG. 4 illustrates a cross-section of a ring shaped motor controlling the pitch of a blade through a planetary gear, as seen from the top.

An electric pitch system for a traditional three blade 5 wind turbine 1 requires the following components:

Three ring shaped pitch motors 10
Three planetary gear units 17
Three brake calipers/brake discs
Three motor 10 control units
Three battery back up units
One rotating electrical power connector
One rotating communication connector
One hub 6 controller cabinet
One set of cables
Three position encoders
Pitch motor 10 requirements:
The ring shaped motor 10 is placed in the hub 6 under or in close proximity of the pitch bearing 7.
The ring shaped motor 10 acts on the blade 5 through a planetary gear 17 with a reduction of between 1:1 and 1:50, preferably between 1:1.5 and 1:20 and most preferred between 1:2 and 1:10, such as 1:4 or 1:5
The maximum blade 5 speed is 12 deg/sec
The maximum blade 5 torque on a traditional 2-3 MW three blade wind turbine is in the range of between 60-100 kNm FIG. 4 illustrates a cross-section of a ring shaped motor 10 controlling the pitch of a blade 5 through a planetary gear 17, as seen from the top.

In this embodiment of the invention a toothed 13 rotor part 12 of a ring shaped motor 10 functions as a sun gear 16 in the planetary gear 17. The teeth of the rotor part 12 mesh with fifteen planet gears 15 distributed evenly around the sun gear 16. In another embodiment the planetary gear 17 could be provided with between 2 and 50, preferably between 3 and 30 and most preferred between 4 and 25 planet gears 15, such as 8, 12, 16 or 24.

Through their planet gear shafts 18, the planet gears 15 are directly mounted on the blade 5 (not shown in FIG. 4) and the planets 14 further mesh with a toothed part 15 of the hub 6. In another embodiment the annulus gear 22 could also be an independent internally toothed gear ring rigidly attached to the hub 6, and likewise, the sun gear 16 could be an independent externally toothed gear ring rigidly attached to the rotor part 12 of the ring shaped motor 10.

In a preferred embodiment of the invention the ring shaped motor 10 is placed concentric with the pitch bearing 7 and the root of the blade 5, but in another embodiment of the invention the ring shaped motor 10 could be positioned eccentric to either the pitch bearing 7, the root of the blade 5 or both, e.g. to efficiently use the limited space in the hub 6.

The described system could also be used in other connections where rotating of large diameter loads is needed. This could e.g. be as a yaw mechanism in a wind turbine 1, the rotating mechanism for a construction crane, the pitch mechanism for the blades of a ships propeller or other places where relatively high torque has to be transferred over a relatively large diameter.

Figure 5:
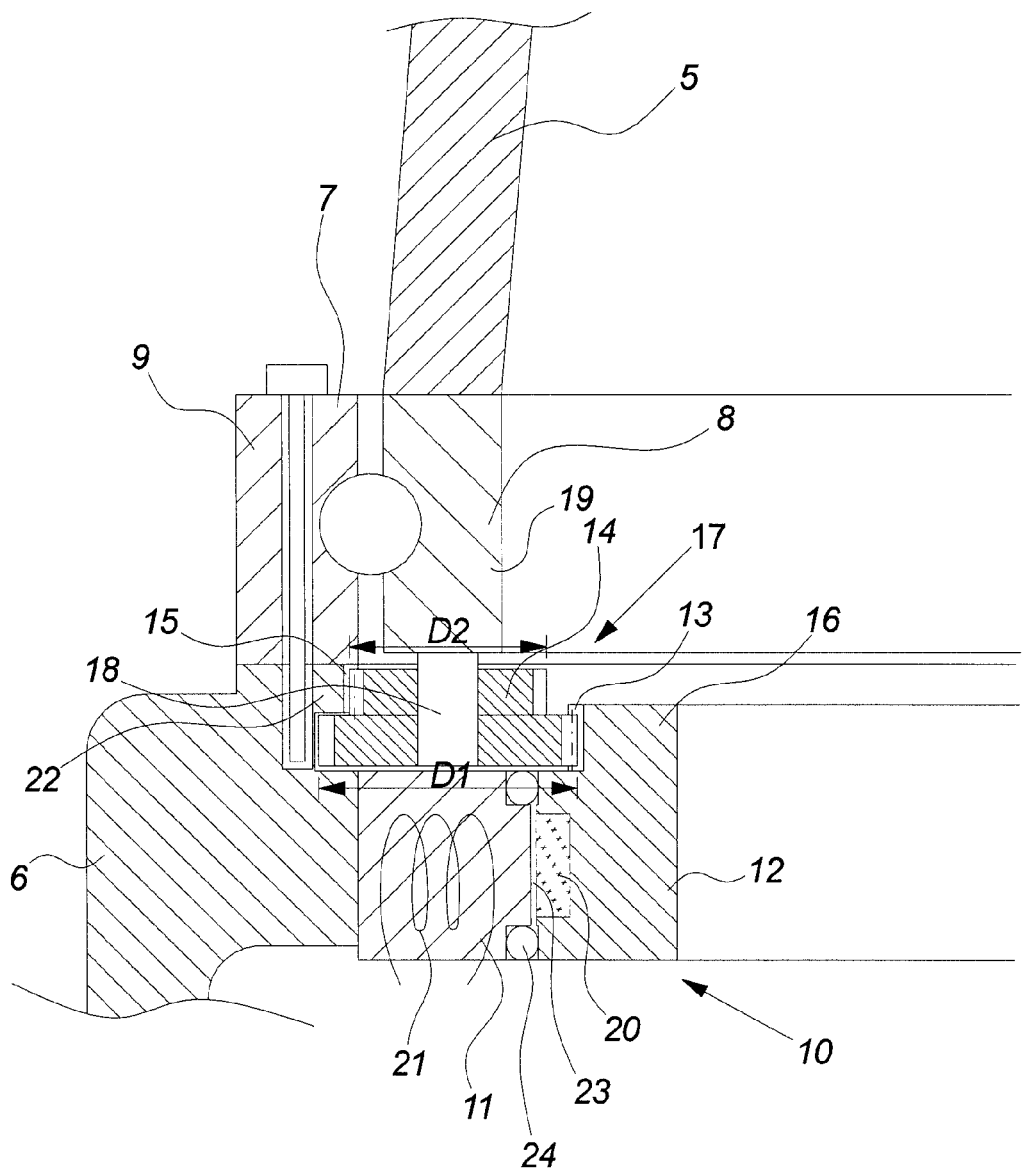
FIG. 5 illustrates a planetary gear comprising two-stage planets, as seen from the side.

FIG. 5 illustrates a planetary gear 17 comprising two-stage planets 14, as seen from the side.

A planetary gear 17 with large sun gear 16 and annulus gear 22 diameter do only have a reduction ratio just above 2. To enhance the gear ratio and still maintain the benefit of the planetary gear 17, planet gears 14 with two different gear diameter D1, D2 can be used. The larger diameter D1 of the planet gears 14 mesh with the sun gear 16 and the smaller diameter D2 of the planets 14 mesh with the annulus gear 22.

It can be advantageous to make the ring shaped motor 10 at the largest diameter possible. The motor torque is in square of the diameter and proportional with the length. Price is proportional to length and diameter. The large diameter is the preferred feature of this type of motor.

Best is a ring shaped motor 10 with a diameter substantially equal to the inner rim of the hub 6 or the pitch bearing 7. This motor 10 must be geared to reduce the torque and hereof the cross section of the motor 10. A planetary gear 17 with large annulus 22 and sun gear 16 diameter can have many planets 14. Say the planets 14 are small and many e.g. 12 planets or more, the load on each is small and the gear module of the sun 16, annulus 22 and planet gears 14 can be small. The classical planetary gear 17 with small planets 14 has a gear ratio just over 2. To enhance the gear ratio and still maintain the benefit of the planetary gear 17, planet gears 14 with two different gear diameter D1, D2 incorporated in the planets 14, can stages the gear ratio of the planetary gear 17 to four or more.

This design reduces the motor torque to 20% or 25% of the blade torque. This does also reduce the cost of the ring shaped motor 10 with a factor possibly in the magnitude of three to four. The cost of the planetary gear 17 is marginal in relation to the cost of the ring shaped motor, which is one of the parameters that justifies the use of a planetary gear in combination with the ring shaped motor for pitching wind turbine blades. Furthermore it is possible to use an open gear solution.

Figure 6:
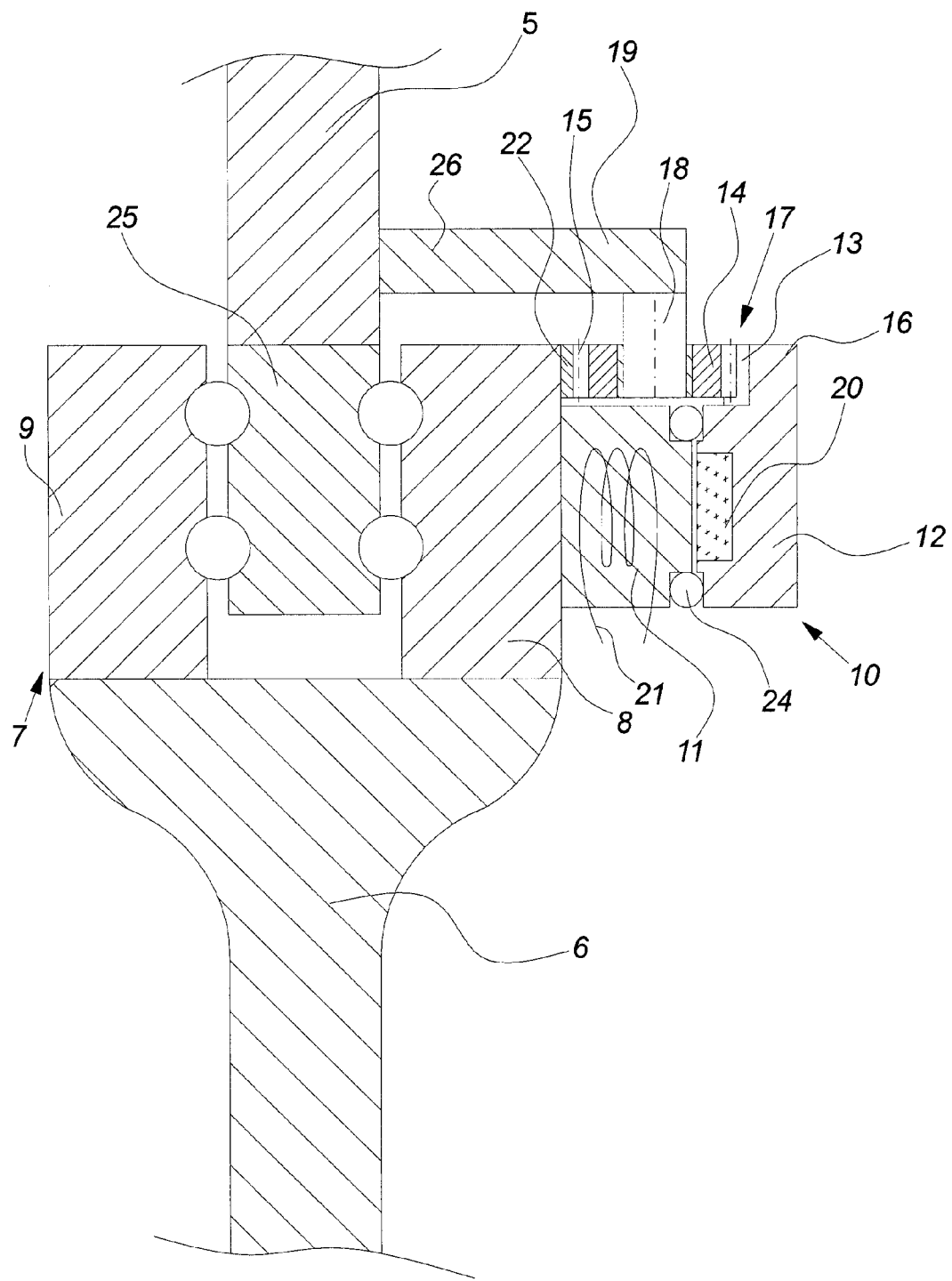
FIG. 6 illustrates a three-ring pitch bearing, a ring shaped motor and a planetary gear, as seen from the side.

FIG. 6 illustrates a part of a cross section of a pitch bearing 7 comprising two columns of each two rows of bearing balls. Between the outer bearing ring 9 and the centre bearing ring 25 is positioned two rows of balls on the same diameter. Between the centre bearing ring 25 and the inner bearing ring 8 is positioned two other rows of bearing balls on another common diameter. The inner and outer bearing rings 8, 9 are rigidly connected to the hub 6, and the centre ring 25 is rigidly connected to the root of the blade 5.

In this embodiment of the invention the planet gears 14 are not connected to the pitch bearing 7, but are instead via a blade flange 26 connected indirectly to the blade 5. An internally toothed ring gear—acting as annulus gear 22 in the planetary gear 17—is connected to the inside surface of the inner bearing ring 8.

In another embodiment of the invention the planets 14 could—by means of their planet gear shafts 18—be connected directly to the blade 5, or the planets 14 could be rigidly connected to the blade 5 in a more indirect way e.g. as shown in FIG. 6 or through a plate connected to the blade 5 and covering the entire hole in the root of the blade 5 (which in this case would acts as the planet carrier 19 of the planetary gear 17), through fixtures or fittings connected to the blade 5 or the bearing ring or rings 8, 9, 25 of the pitch bearing 7 which is/are connected to the blade 5. Hence, the planets 14 can be connected to the blade in many ways e.g. directly, where the blade serve as the planet carrier in the planetary gear 17, or more indirectly where something else in between the planets 14 and the blade acts as planet carrier 19 or the connection can be done in another way as long as it ensures a substantially rigid connection between the planet gears 14 and the blade 5.

Figure 7:
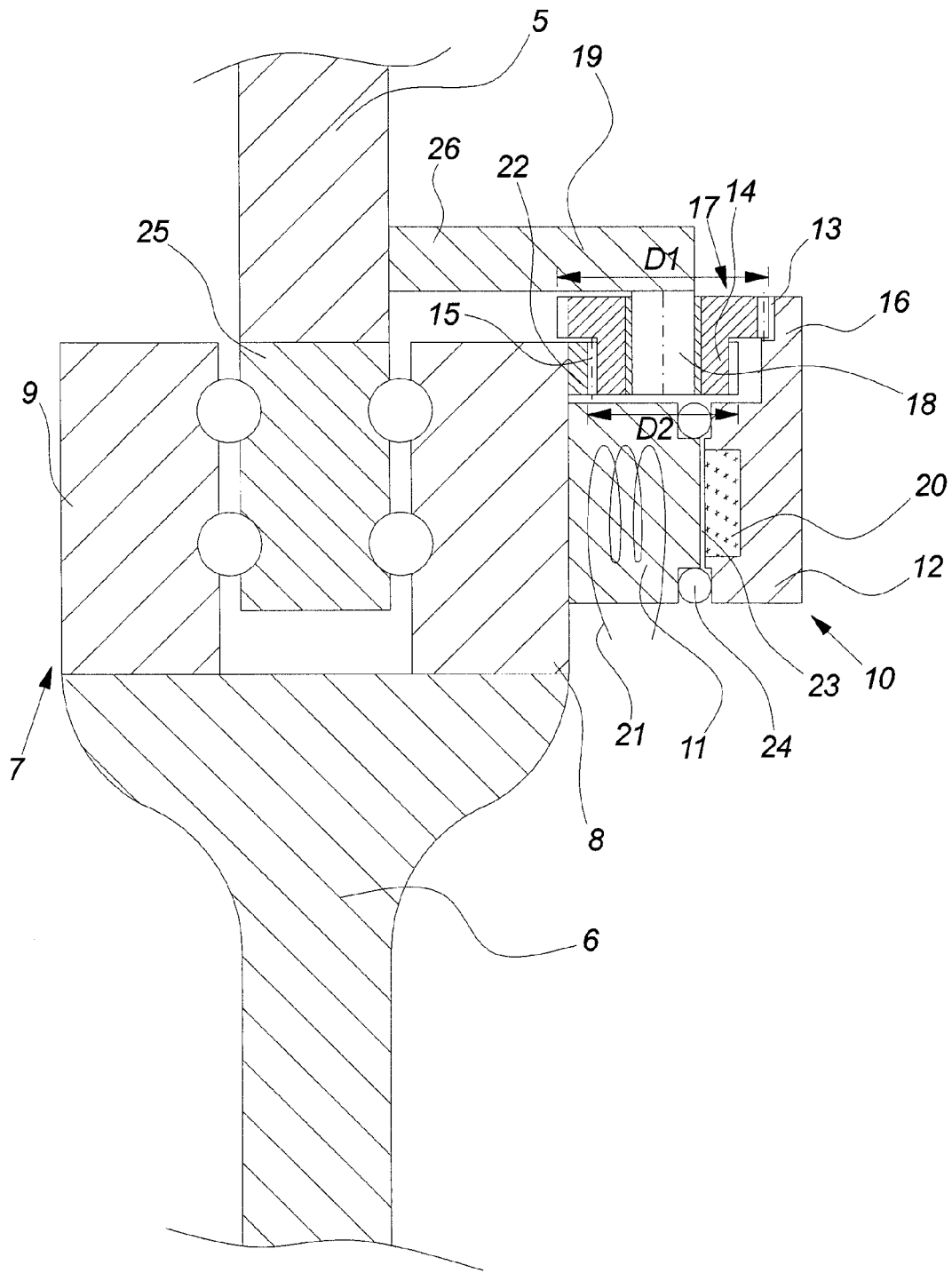
FIG. 7 illustrates a three-ring pitch bearing, a ring shaped motor and a planetary gear comprising two stage planets, as seen from the side.

FIG. 7 illustrates a three-ring pitch bearing 7, a ring shaped motor 10 and a planetary gear 17 comprising two stage planets 14, as seen from the side.

Figure 8:
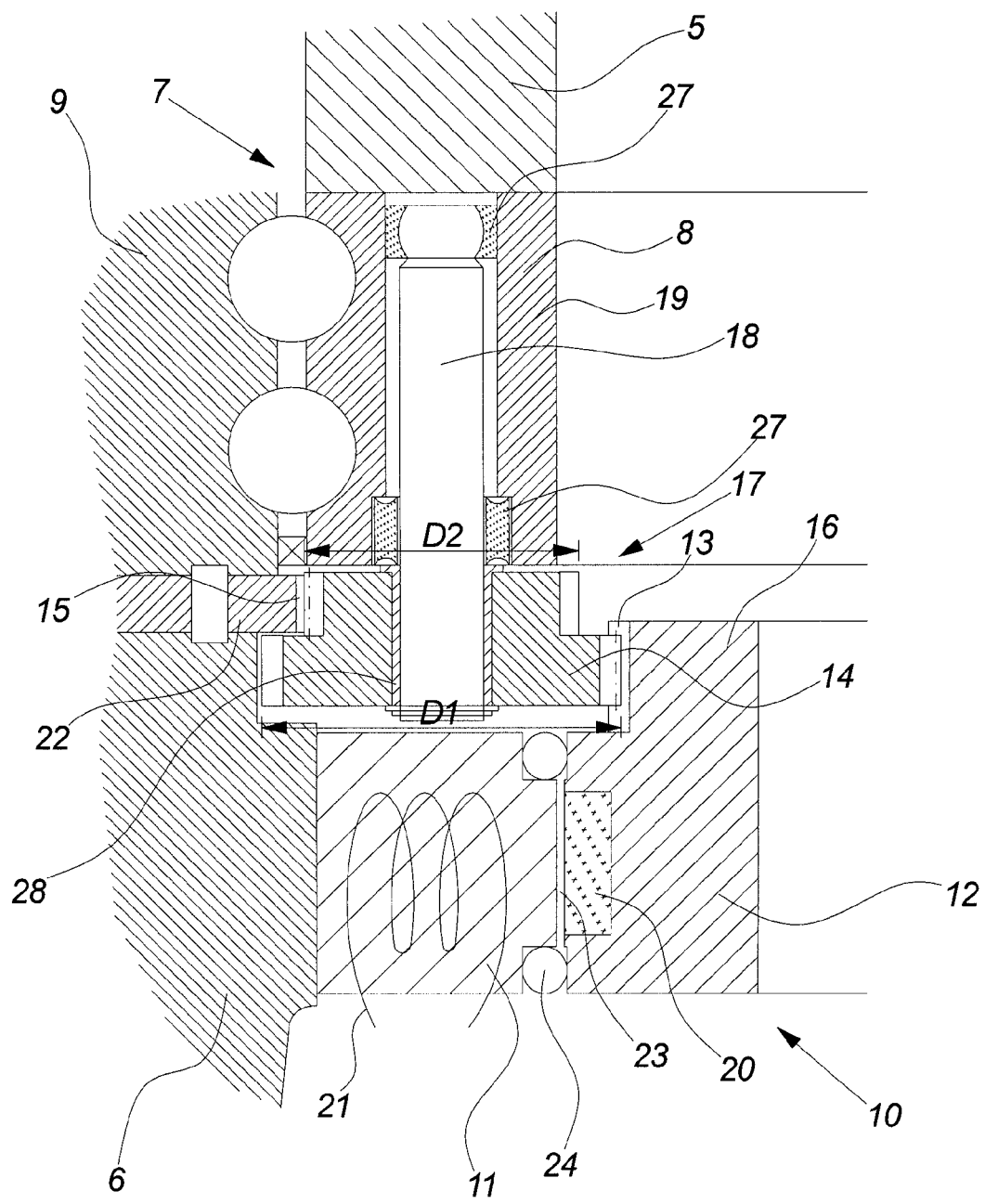
FIG. 8 illustrates an embodiment of how the planet gears could be mounted, as seen from the side.

FIG. 8 illustrates an embodiment of how the planet gears 14 could be mounted, as seen from the side.

In this embodiment of the invention the planet gears 14 are mounted by means of flexible bearings 27. In this embodiment these flexible bearings 27 does not enable rotation of the shaft 18 but does only serve at flexible means for allowing a small displacement of the planet gears 14 angle and/or rotation axis. The rotation of the planet gears 14 is in this embodiment enabled by a planet bearing 28 placed between the planet gears 14 and the shaft 18. These planet bearings 28 could in an preferred embodiment be plain bearings but in another embodiment they could also be ball bearings, needle bearing, roller bearings or any combination hereof.

In another embodiment of the invention the flexible bearings 27 suspending the planet shafts 18 could be combined with spherical bearings in the planet gear 14 for ensuring that the planets 14 at all times are placed correctly and in the right angle. The inaccuracy compensation could also be done by mounting the shafts 18 by means of spherical bearings, by incorporating a flexible bearing 27 in the planets 14 or both.

Providing the planet gears with a small degree of flexibility can also be done in a number of other ways within the scope of the invention. The planet gears 14, the annulus gear 22 and sun gear 16, the planet carrier 19 and/or the planet gear shafts 18 could be made in a slightly flexible material, the sun gear 16 and/or and or the annulus gear 22 could be divided into an number of toothed segments, which all where individually and flexibly mounted or the system could in another way be provided with means compensating for any inaccuracy of the parts 5, 6, 13, 14, 15, 16, 18, 19, 22, any inaccuracy between the parts 5, 6, 13, 14, 15, 16, 18, 19, 22 or any slight distortion of the parts 5, 6, 13, 14, 15, 16, 18, 19, 22.

The invention has been exemplified above with reference to specific examples of ring shaped motors 10, planetary gears 17 and use of such. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Hub
7. Pitch bearing
8. Inner bearing ring
9. Outer bearing ring
10. Ring shaped motor
11. Stator part of ring shaped motor
12. Rotor part of ring shaped motor
13. Rotor teeth
14. Planet gear
15. Hub teeth
16. Sun gear
17. Planetary gear
18. Planet gear shaft
19. Planet carrier
20. Permanent magnet
21. Wound armature
22. Annulus gear
23. Gab
24. Motor bearing
25. Centre bearing ring
26. Blade flange
27. Flexible bearing
28. Planet bearing
D1. First planet gear diameter
D2. Second planet gear diameter

What is claimed is:

1. A wind turbine rotor comprising
   at least one blade, and
   at least one pitch mechanism comprising a pitch bearing and a ring shaped motor for controlling said at least one blade,
   wherein said ring shaped motor is of a diameter substantially equal to the inner rim of said pitch bearing, and
   wherein said ring shaped motor controls said blade through gears of a planetary type.

2. The wind turbine rotor according to claim 1, wherein said ring shaped motor controls said blade's pitch angle in relation to a hub of said rotor.

3. The wind turbine rotor according to claim 1, wherein an annulus gear of said planetary gears is rigidly mounted on a hub of said rotor.

4. The wind turbine rotor according to claim 1, wherein said planetary gears comprise a plurality of planet gear wheels.

5. The wind turbine rotor according to claim 4, wherein said plurality of planet gear wheels are directly mounted on said at least one blade.

6. The wind turbine rotor according to claim 4, wherein said plurality of planet gear wheels are flexibly mounted.

7. The wind turbine rotor according to claim 4, wherein at least one of said plurality of planet gear wheels comprises at least two different gear stages (D1, D2) for altering the gear ratio of said gears of a planetary type.

8. The wind turbine rotor according to claim 1, wherein a rotor part of said ring shaped motor comprises a sun gear of said planetary gears.

9. The wind turbine rotor according to claim 8, wherein said sun gear of said planetary gears is formed integrally in said rotor part of said ring shaped motor.

10. The wind turbine rotor according to claim 1, wherein said ring shaped motor comprises at least one motor bearing substantially fixating the gap between a rotor part and a stator part of said ring shaped motor.

11. The wind turbine rotor according to claim 1, wherein said gears of a planetary type reduce the rotation speed of said blade in relation to a rotor part of said ring shaped motor.

12. A wind turbine comprising a wind turbine rotor according to claim 1.

13. A method for controlling at least one blade of a wind turbine rotor, said method comprising the steps of:

establishing a torque of via a ring shaped motor having a diameter substantially equal to the inner rim of a pitch bearing connected to said blade;

increasing said torque via gears of a planetary type; and making said increased torque control said blade.

14. The method according to claim 13, wherein said ring shaped motor controls said blades pitch angle in relation to a hub of said rotor.

15. The wind turbine rotor according to claim 1, wherein an annulus gear of said planetary gears is rigidly indirectly mounted on a hub of said rotor.

16. The wind turbine rotor according to claim 4, wherein said plurality of planet gear wheels are indirectly mounted on said at least one blade.

17. The wind turbine rotor according to claim 1, wherein said planetary gears comprise more than eight planet gear wheels.

* * * * *